United States Patent
Ramakrishnan et al.

(10) Patent No.: US 10,521,455 B2
(45) Date of Patent: Dec. 31, 2019

(54) SYSTEM AND METHOD FOR A NEURAL METADATA FRAMEWORK

(71) Applicant: NANOBI DATA AND ANALYTICS PRIVATE LIMITED, Bangalore (IN)

(72) Inventors: Mahesh Ramakrishnan, Bangalore (IN); Sumant Sarkar, Bangalore (IN)

(73) Assignee: NANOBI DATA AND ANALYTICS PRIVATE LIMITED, Karnataka (IN)

( * ) Notice: Subject to any disclaimer, the term of this patent is extended or adjusted under 35 U.S.C. 154(b) by 349 days.

(21) Appl. No.: 14/218,014

(22) Filed: Mar. 18, 2014

(65) Prior Publication Data

US 2014/0289182 A1 Sep. 25, 2014

(51) Int. Cl.
*G06F 16/28* (2019.01)

(52) U.S. Cl.
CPC .................. *G06F 16/283* (2019.01)

(58) Field of Classification Search
CPC ................ G06F 17/30592; G06F 16/283
See application file for complete search history.

(56) References Cited

U.S. PATENT DOCUMENTS

| | | | | |
|---|---|---|---|---|
| 7,233,952 | B1* | 6/2007 | Chen | G06Q 10/06 |
| 8,417,715 | B1* | 4/2013 | Bruckhaus | G06F 17/30994 705/26.1 |
| 2003/0088586 | A1* | 5/2003 | Fitzpatrick | G06F 16/252 |
| 2007/0239769 | A1* | 10/2007 | Fazal | G06F 17/30554 |
| 2008/0208621 | A1* | 8/2008 | Karkanias | G06Q 50/22 705/2 |
| 2009/0319544 | A1* | 12/2009 | Griffin | G06F 17/30563 |
| 2010/0280990 | A1* | 11/2010 | Castellanos | G06F 17/30592 707/602 |
| 2011/0066589 | A1* | 3/2011 | Chang | G06F 17/30592 707/600 |
| 2012/0290950 | A1* | 11/2012 | Rapaport | H04L 51/32 715/753 |
| 2014/0108308 | A1* | 4/2014 | Stout | G06N 3/08 706/12 |
| 2014/0229422 | A1* | 8/2014 | Jain | G06F 17/30592 707/600 |
| 2015/0100543 | A1* | 4/2015 | Tsuchida | G06F 16/283 707/603 |

* cited by examiner

*Primary Examiner* — James Trujillo
*Assistant Examiner* — Hubert Cheung
(74) *Attorney, Agent, or Firm* — Barry Choobin; Patent 360 LLC

(57) ABSTRACT

The embodiments herein provide a method and process for storing and provisioning system catalogue(s) of metadata object relationships, from diverse and disparate physical data elements. The method comprises the steps of creating a logical enterprise data warehouse by assembling a plurality of nanomart storage structures; visually mashing up a plurality of interconnected data elements from the plurality of nanomart storage structures to produce a business analytics; and generating a neural metadata framework for providing a mathematical model to abstract and catalogue the plurality of data elements from the plurality of nanomart storage structures.

8 Claims, 9 Drawing Sheets

| Array Index | A1 Value | A2 value | N Value |
|---|---|---|---|
| [Time, Month, Number of Items Sold, Number Of Items Sold] | 0 | 1 | 1.000 |
| [Time, Month, Number of Items Sold, Revenue] | 2 | 3 | 0.440 |
| [Time, Month, Number of Items Sold, Expenses] | 0 | 0 | 0.590 |
| [Time, Month, Number of Items Sold, Temperature] | 1 | 0 | 0.630 |
| [Time, Month, Revenue, Number of Items Sold] | 2 | 0 | 0.370 |
| [Time, Month, Revenue, Revenue] | 2 | 0 | 1.000 |
| [Time, Month, Revenue, Expenses] | 0 | 0 | 0.340 |
| [Time, Month, Revenue, Temperature] | 0 | 0 | 0.610 |
| [Time, Month, Expenses, Number of Items Sold] | 0 | 0 | 0.370 |
| [Time, Month, Expenses, Revenue] | 0 | 0 | 0.470 |
| [Time, Month, Expenses, Expenses] | 0 | 0 | 1.000 |
| [Time, Month, Expenses, Temperature] | 0 | 0 | 0.110 |
| [Time, Month, Temperature, Number of Items Sold] | 0 | 0 | 0.190 |
| [Time, Month, Temperature, Revenue] | 2 | 0 | 0.720 |
| [Time, Month, Temperature, Expenses] | 0 | 2 | 0.350 |
| [Time, Month, Temperature, Temperature] | 0 | 0 | 1.000 |
| [Time, Quarter, Number of Items Sold, Number of Items Sold] | 1 | 0 | 1.000 |
| [Time, Quarter, Number of Items Sold, Revenue] | 0 | 0 | 0.280 |
| [Time, Quarter, Number of Items Sold, Expenses] | 0 | 0 | 0.210 |
| [Time, Quarter, Number of Items Sold, Temperature] | 0 | 0 | 0.930 |
| [Time, Quarter, Revenue, Number of Items Sold,] | 0 | 1 | 0.680 |
| [Time, Quarter, Revenue, Revenue] | 1 | 0 | 1.000 |
| [Time, Quarter, Revenue, Expenses] | 0 | 2 | 0.230 |
| [Time, Quarter, Revenue, Temperature] | 0 | 0 | 0.780 |

| | | | |
|---|---|---|---|
| [Geography, State, Expenses, Expenses] | 0 | 0 | 1.000 |
| [Geography, State, Expenses, Temperature] | 0 | 0 | 0.970 |
| [Geography, State, Temperature, Number of Items Sold] | 0 | 0 | 0.100 |
| [Geography, State, Temperature, Revenue] | 0 | 0 | 0.010 |
| [Geography, State, Temperature, Expenses] | 0 | 0 | 0.820 |
| [Geography, State, Temperature, Temperature] | 1 | 0 | 1.000 |
| [Geography, NIL, Number of Items Sold, Number of Items Sold] | 0 | 0 | 1.000 |
| [Geography, NIL, Number of Items Sold, Revenue] | 0 | 0 | 0.130 |
| [Geography, NIL, Number of Items Sold, Expenses] | 0 | 0 | 0.100 |
| [Geography, NIL, Number of Items Sold, Temperature] | 3 | 0 | 0.840 |
| [Geography, NIL, Revenue, Number of Items Sold] | 0 | 0 | 0.690 |
| [Geography, NIL, Revenue, Revenue] | 0 | 3 | 1.000 |
| [Geography, NIL, Revenue, Expenses] | 2 | 0 | 0.770 |
| [Geography, NIL, Revenue, Temperature] | 3 | 0 | 0.260 |
| [Geography, NIL, Expenses, Number of Items Sold] | 0 | 0 | 0.820 |
| [Geography, NIL, Expenses, Revenue] | 3 | 0 | 0.940 |
| [Geography, NIL, Expenses, Expenses] | 0 | 0 | 0.930 |
| [Geography, NIL, Expenses, Temperature] | 0 | 3 | 1.000 |
| [Geography, NIL, Temperature, Number of Items Sold] | 0 | 0 | 0.170 |
| [Geography, NIL, Temperature, Revenue] | 0 | 0 | 0.110 |
| [Geography, NIL, Temperature, Expenses] | 1 | 0 | 0.760 |
| [Geography, NIL, Temperature, Temperature] | 0 | 0 | 1.000 |

FIG.6B

SYSTEM AND METHOD FOR A NEURAL METADATA FRAMEWORK

CROSS-REFERENCE TO RELATED APPLICATIONS

The embodiments herein claims priority to an Indian Provisional Patent Application with serial number 1259/CHE/2013 filed on Mar. 22, 2013 and entitled, "NEURAL METADATA FRAMEWORK AND VISUAL MASHUP". The contents of the application are included in entirety herein by reference.

BACKGROUND

Technical Field

The embodiments herein generally relates to a method and process for storing and provisioning system catalogue(s) of metadata object relationships for use, based on statistically and contextually relevant associations between metadata, learned through application of various statistical models, on linked underlying data and other information, which may or may not be physically related. The embodiments herein particularly relates to a method and process for storing and provisioning system catalogue(s) of metadata object relationships, through a system driven process of learning, using various statistical methods on (a) the union of metadata of the related and unrelated data structures or stores, which may or may not be physically related, (b) human interactions and (c) the data stored in the underlying related and unrelated data structures or stores, which may or may not be physically related. The embodiments herein more particularly relates to a method and system for utilizing such provisioned system catalogue(s) to facilitate a more intelligent and statistically validated, data transference, analytical and visualization experiences.

Description of the Related Art

In the present circumstances, information is available as discrete data elements with inter-relationships within a defined physical universe of data. It is up to the individual to seek the data elements he needs, to take correct decisions. The current tools just provide the entire list of data elements without any guidance on the data elements that are relevant to the problem at hand.

The advent of powerful servers, large-scale data storages and other information infrastructure has spurred the development of advanced data warehousing and data mining applications. Structured Query Language (SQL) engines, online analytical processing (OLAP) databases and inexpensive large disk arrays have for instance been harnessed in financial, scientific, medical and other fields to capture and analyze vast streams of transactional, experimental and other data. The mining of the data can reveal sales trends, weather patterns, disease epidemiology and other patterns not evident from more limited or smaller-scale analysis.

In the case of data management, the task of receiving, conditioning, and analyzing large quantities of information is particularly challenging. The sources of data for an organization contain data records in widely varying formats. The data records may, for instance, contain different numbers or types of fields, which may have to be conformed to a standard format for warehousing and searching. When such data records are stored in a data warehouse, the aggregation of all such differing data points may be difficult to store in a physically or logically consistent structure. In today's world, the data universe extends beyond the confines of the business, and often the data external to an organization play an important role in business understanding. Bringing these together in a simple manner requires efforts in the order of large magnitude.

Even when the data are conditioned and stored, the aggregation of data may prove difficult to analyze or mine for the most relevant and related data. Often extremely large systems with a high volume of data are inefficient to meet the business requirements. Such systems are inefficient because querying the various data sources to retrieve the relevant and related data requires a significant overhead processing. This heavy back-end processing is time consuming and particularly burdensome to the server and network infrastructure. The organizations are forced to rely on a pre-built business intelligence content. These out-of-the-box data marts, or fact tables, are generic and of limited value and confined to the space of a defined and physically related universe of data. Newer forms of transactions are challenging the frontiers of data warehousing and business intelligence. The ability to bring them into the enterprise fold of business intelligence involves a significant impact on the data structures of these enterprises.

Hence there is a need for an efficient method for gaining a knowledge of the underlying structure of the data to build the useful incremental data marts that could alleviate the strain on the overall infrastructures as well as to meet other challenges in receiving, storing, and analyzing large-scale data, fast and effectively.

The above mentioned shortcomings, disadvantages and problems are addressed herein and which will be understood by reading and studying the following specification.

Objects of the Embodiments

The primary object of the embodiments herein is to provide a method and process for storing and provisioning for use, system catalogue(s) of metadata object relationships, based on statistically and contextually relevant associations between metadata objects, learned through the application of various statistical models on linked underlying data and other information, which may or may not be physically related. This collection of system catalogue(s) is referred to as neural metadata, and the method and process for its creation and use, is referred to as the neural metadata framework.

Yet another object of the embodiments herein is to provide a method and means of utilizing such provisioned system catalogue(s) to facilitate a more intelligent and statistically validated, data transference, analytical and visualization experiences.

Yet another object of the embodiments herein is to provide a method for the creation of physical stores of varied kinds of related or unrelated data based on simple (defined or derived) data models called nanomarts, their related technical metadata, using business glossaries or terms, technical metadata and a direct upload of data through connectors, web services, or files.

Yet another object of the embodiments herein is to provide a method to fetch a splice of data from the respective nanomarts based on user privileges to enrich user interactions.

These and other objects and advantages of the embodiments herein will become readily apparent from the following detailed description taken in conjunction with the accompanying drawings.

SUMMARY

The embodiments herein provide a method and process for storing and provisioning system catalogue(s) of metadata object relationships, through a system driven process of learning, using various statistical methods on (a) the union of metadata of the related and unrelated data structures or stores, which may or may not be physically related, (b) human interactions and (c) the data stored in the underlying related and unrelated data structures or stores, which may or may not be physically related. The embodiments herein further provide a method and system for utilizing such provisioned system catalogue(s) to facilitate a more intelligent and statistically validated, data transference, analytical and visualization experiences.

The various embodiments herein provide a method and process for storing and provisioning system catalogue(s) of metadata object relationships, from diverse and disparate physical data elements. The method comprises the steps of creating a logical enterprise data warehouse by assembling a plurality of nanomart storage structures; visually mashing up a plurality of interconnected data elements from the plurality of nanomart storage structures to produce a business analytics; and generating a neural metadata framework for providing a mathematical model to abstract and catalogue the plurality of data elements from the plurality of nanomart storage structures.

According to an embodiment herein, the nanomart storage structure comprises a set of measures and a set of dimensions. The set of dimensions comprises dimension levels and dimension members.

According to an embodiment herein, the measures define a measurable parameter for an entity. For example: the measurable parameter includes sales revenue, expense, and number of customers in an organization.

According to an embodiment herein, the dimensions define a sub-measurable parameter for the measures. For example: the dimensions include product, time, geographical area or territory or region, sales representative. In "Sales broken down by product", sales is the measure and product is the dimension.

According to an embodiment herein, the dimension levels define a sub level in a dimension. Further, the dimension level comprises a set of dimension members.

According to an embodiment herein, the method and process for storing and provisioning system catalogue(s) of metadata object relationships, from diverse and disparate physical data elements further comprises the steps of applying a plurality of algorithms for identifying an interconnected relationship of data elements; adopting a machine learning process to acquire a common relationship of from a plurality of the identified interconnected relationship of the data elements; performing a data mining to identify a statistical correlation between the data elements; and computing a measure of strength of interconnections between the data elements by a preset algorithm.

According to an embodiment herein, the neural metadata framework stores and provisions a neural metadata from a plurality of sources of discrete data elements. The discrete data elements are a plurality of unorganized data curated from a plurality of data stores that are arranged internal or external to a referenced organization or entity.

According to an embodiment herein, the data elements are abstracted and catalogued from a plurality of data sources distributed within a referenced organization or entity. The abstracted and catalogued data elements form a neural metadata bases on an inter-relationship or interconnection between the data elements.

According to an embodiment herein, the neural metadata is configured to select a desired and suitable discrete data elements stored within the nanomart storage structure.

According to an embodiment herein, the data elements are abstracted and catalogued using a mathematical model based on a business glossary. The business glossary comprises a plurality of representations of values and codes stored in the plurality of nanomart storage structures.

According to an embodiment herein, the neural metadata framework is an architecture built with a plurality of artificial intelligence modules. The plurality of artificial intelligence modules defines relationships between the data elements for storing and provisioning the neural metadata.

According to an embodiment herein, the plurality of nanomart storage structures is a physical storage device of related and unrelated data derived from a plurality of files, technical metadata, and direct upload of data through connectors from web based on a mathematical model using the business glossary.

According to an embodiment herein, the plurality of algorithms is applied to identify a type of interconnected relationship between the interconnected data elements, by estimating an inter-relationship of a construct. The inter-relationship of the construct is identified based on the stored explicit human inputs, and implicit derivations and calculations of the cross-correlations among the data elements in the plurality of nanomart storage structures.

According to an embodiment herein, the explicit human inputs comprise an ordering of data elements together or using the data elements in the same context.

According to an embodiment herein, the neural metadata is stored and provisioned based on the estimated strength of the interconnections between the data elements.

According to an embodiment herein, the visual mashing up of the interconnected metadata elements is prepared and presented after recognizing the inter-relationships of the data elements from the plurality of nanomart storage structures, to produce a business analytics. The visual mashing up of the interconnected data elements from the plurality of nanomart storage structures is performed to create results of the business analytics in a plurality of forms. The plurality of forms includes graphical representations, charts, and graphs.

According to an embodiment herein, the results of the business analytics and user picked analytical results of the interconnected data elements are stored. The plurality of machine learning algorithms of the neural metadata framework are applied to enrich a future process of business analytics based on the results of analysis stored over a period of time.

According to an embodiment herein, a method for maintaining the neural metadata scores to minimize the cost of maintenance of scores is provided. The method adopts an event driven incremental strategy for minimizing the cost of the maintenance of the scores.

According to an embodiment herein, when the fresh data are loaded into a nanomart, the subarrays of N[][][][] that pertain to the measures of the affected nanomart are recomputed. Further, when a new measure is created or deleted, the additional subarrays are inserted to the subarrays of the dimensions against this new measure is reportable. Further, when a new dimension is created or deleted, additional subarrays are inserted into the array against the new dimension and its levels. Further, when a new dimension level is created in an existing dimension, and the dimension is the one that already has the NLMx levels, a subarray is inserted against every dimensions and NLMx is incremented by 1. If the dimension affected is less than NLmx levels, an empty subarray that already exists is identified to accommodate the values. This is used to fill the scores and the matrix is a bit less sparse.

According to an embodiment herein, when an existing measure becomes reportable against a dimension that it is not reportable against earlier, no new space needs to be allocated. The subarrays representing the combination of measures are filled with the scores. Further, the deletions are handled by filling the affected subarrays with blanks. If a measure is no longer reported by a dimension, the affected subarray of the dimension is filled with blanks. The non trivial case is the one in which a dimension level is deleted and the dimension has NLmx levels before the deletion. If there is no other dimension that has NLmx levels, it leads to a decrease in NLmx by 1. The unnecessary subarrays are deleted now.

According to an embodiment herein, a method for optimizing disk space and memory is provided. The method of optimizing disk space and memory comprises, handling the sparsity of the matrices A1, A2 and N, by storing the number of levels in each dimension separately. The arrays are traversed by looking this up first. By this process, the boundaries of each dimension in A1/A2/N are determined. Since the relationship strength is commutative, the value of <M1, M2> is the same as <M2, M1>. Hence half of the matrix including the diagonal is skipped.

According to an embodiment herein, a method for run time optimization is provided. The method comprises eliminating the array copies in the algorithm outlined by having a structure that stores the scores in the node and using a linked list instead of an array.

According to an embodiment herein, a method for optimizing multiple dimensions in a report is provided. The case where there are more than one dimensions disclosed in a report, the mashup suggestions query is done for one dimension at a time. From the results, those measures are taken which are reportable against all the dimensions involved. Finally, the measures are presented as a mashup suggestion in a descending order of their net score.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 6A-FIG. 6B jointly illustrates a table for providing a visual representation of a logical enterprise data warehouse created by assembling a plurality of nanomart storage structures, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
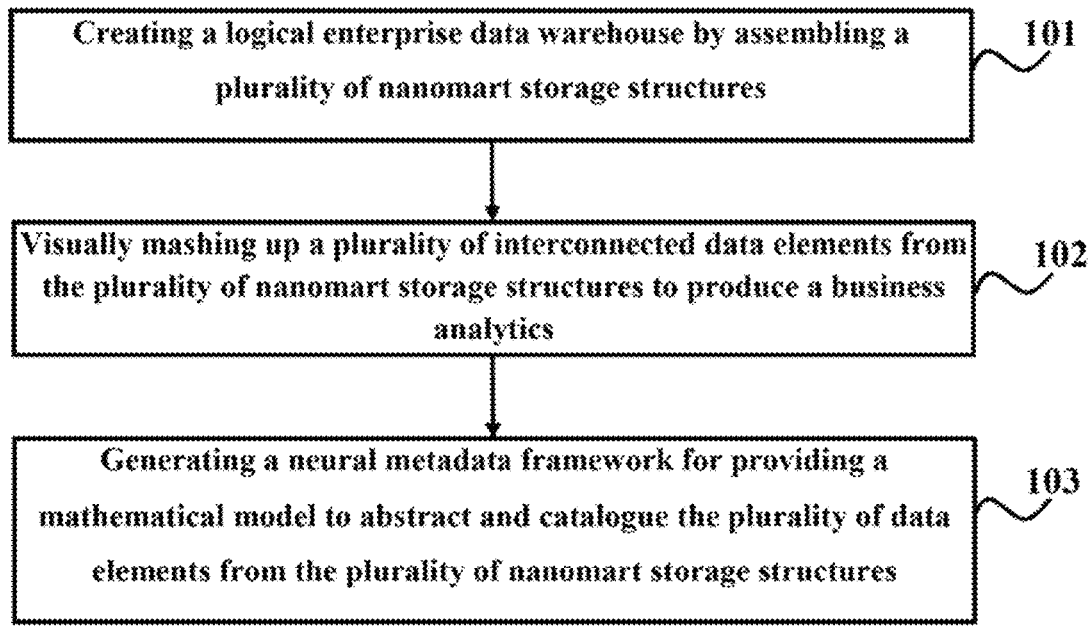
FIG. 1 illustrates a flowchart indicating a method for storing and provisioning system catalogue(s) of metadata object relationships, from diverse and disparate physical data elements, according to an embodiment herein.

FIG. 1 illustrates a flowchart indicating a method for storing and provisioning system catalogue(s) of metadata object relationships, from diverse and disparate physical data elements, according to an embodiment herein. The method comprises the steps of creating a logical enterprise data warehouse by assembling a plurality of nanomart storage structures (101); visually mashing up a plurality of interconnected data elements from the plurality of nanomart storage structures to produce a business analytics (102); and generating a neural metadata framework for providing a mathematical model to abstract and catalogue the plurality of data elements from the plurality of nanomart storage structures (103).

According to an embodiment herein, the nanomart storage structure comprises a set of measures and a set of dimensions. The set of dimensions comprises dimension levels and dimension members.

According to an embodiment herein, the measures define a measurable parameter for an entity, the dimensions define a sub-measurable parameter for the measures and the dimension levels define a sub level in a dimension. Further, the dimension level comprises a set of dimension members.

According to an embodiment herein, the neural metadata framework stores and provisions a neural metadata from a plurality of sources of discrete data elements. The discrete data elements are a plurality of unorganized data curated from a plurality of data stores that are arranged internal or external to a referenced organization or entity.

According to an embodiment herein, the data elements are abstracted and catalogued from a plurality of data sources distributed within a referenced organization or entity. The abstracted and catalogued data elements form a neural metadata bases on an inter-relationship or interconnection between the data elements.

According to an embodiment herein, the neural metadata is configured to select a desired and suitable discrete data elements stored within the nanomart storage structure.

According to an embodiment herein, the data elements are abstracted and catalogued using a mathematical model based on a business glossary. The business glossary comprises a plurality of representations of values and codes stored in the plurality of nanomart storage structures.

According to an embodiment herein, the neural metadata framework is an architecture built with a plurality of artificial intelligence modules. The plurality of artificial intelligence modules defines relationships between the data elements for storing and provisioning the neural metadata.

According to an embodiment herein, the plurality of nanomart storage structures is a physical storage device of related and unrelated data derived from a plurality of files, technical metadata, and direct upload of data through connectors from web based on a mathematical model using the business glossary.

Figure 2:
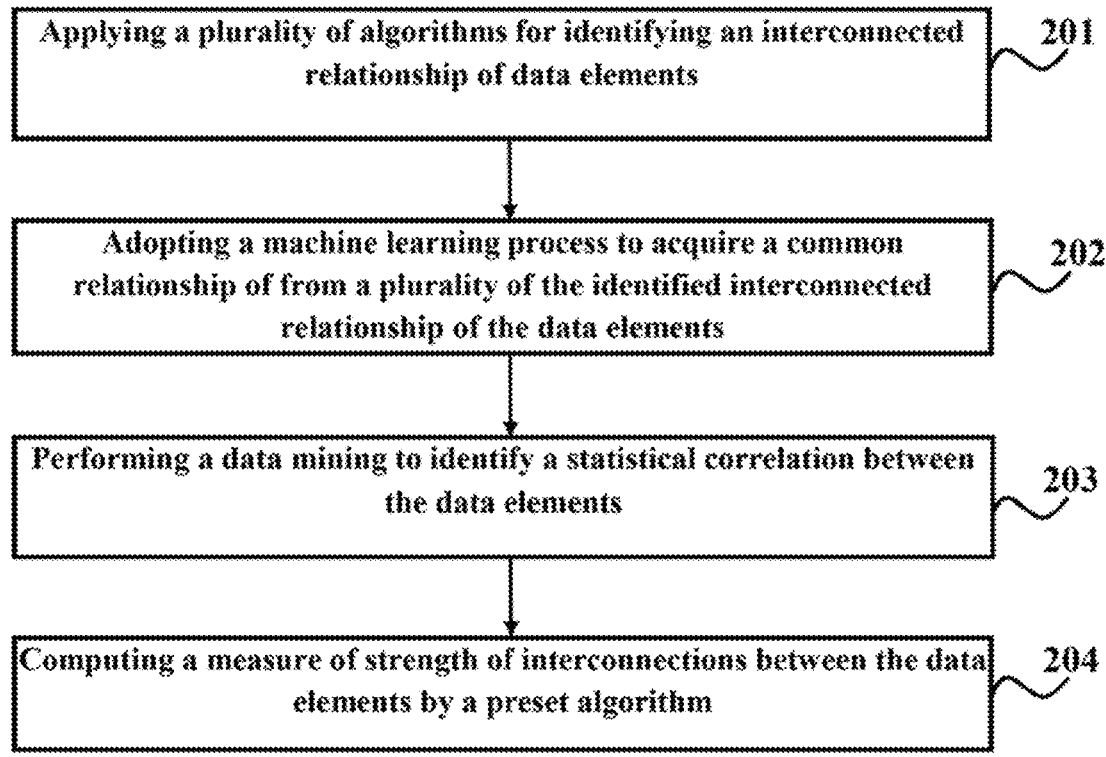
FIG. 2 illustrates a flowchart indicating a method for creating a logical enterprise data warehouse by assembling a plurality of nanomart storage structures, according to an embodiment herein.

FIG. 2 illustrates a flowchart indicating a method for creating a logical enterprise data warehouse by assembling a plurality of nanomart storage structures, according to an embodiment herein. The method comprises the steps of applying a plurality of algorithms for identifying an interconnected relationship of data elements (201); adopting a machine learning process to acquire a common relationship of from a plurality of the identified interconnected relationship of the data elements (202); performing a data mining process to identify a statistical correlation between the data elements (203); and computing a measure of strength of interconnections between the data elements by a preset algorithm (204).

According to an embodiment herein, the plurality of algorithms is applied to identify a type of interconnected relationship between the interconnected data elements, by estimating an inter-relationship of a construct. The inter-relationship of the construct is identified based on the stored explicit human inputs, and implicit derivations and calculations of the cross-correlations among the data elements in the plurality of nanomart storage structures.

According to an embodiment herein, the explicit human inputs comprises ordering of data elements together or using the data elements in the same context.

According to an embodiment herein, the neural metadata is stored and provisioned based on the estimated strength of the interconnections between the data elements.

According to an embodiment herein, the visual mashing up of the interconnected metadata elements is prepared and presented after recognizing the inter-relationships of the data elements from the plurality of nanomart storage structures, to produce a business analytics. The visual mashing up of the interconnected data elements from the plurality of nanomart storage structures is performed to create results of the business analytics in a plurality of forms. The plurality of forms includes graphical representations, charts, and graphs.

According to an embodiment herein, the results of the business analytics and user picked analytical results of the interconnected data elements are stored. The plurality of machine learning algorithms of the neural metadata framework are applied to enrich a future process of business analytics based on the results of analysis stored over a period of time.

Figure 3:
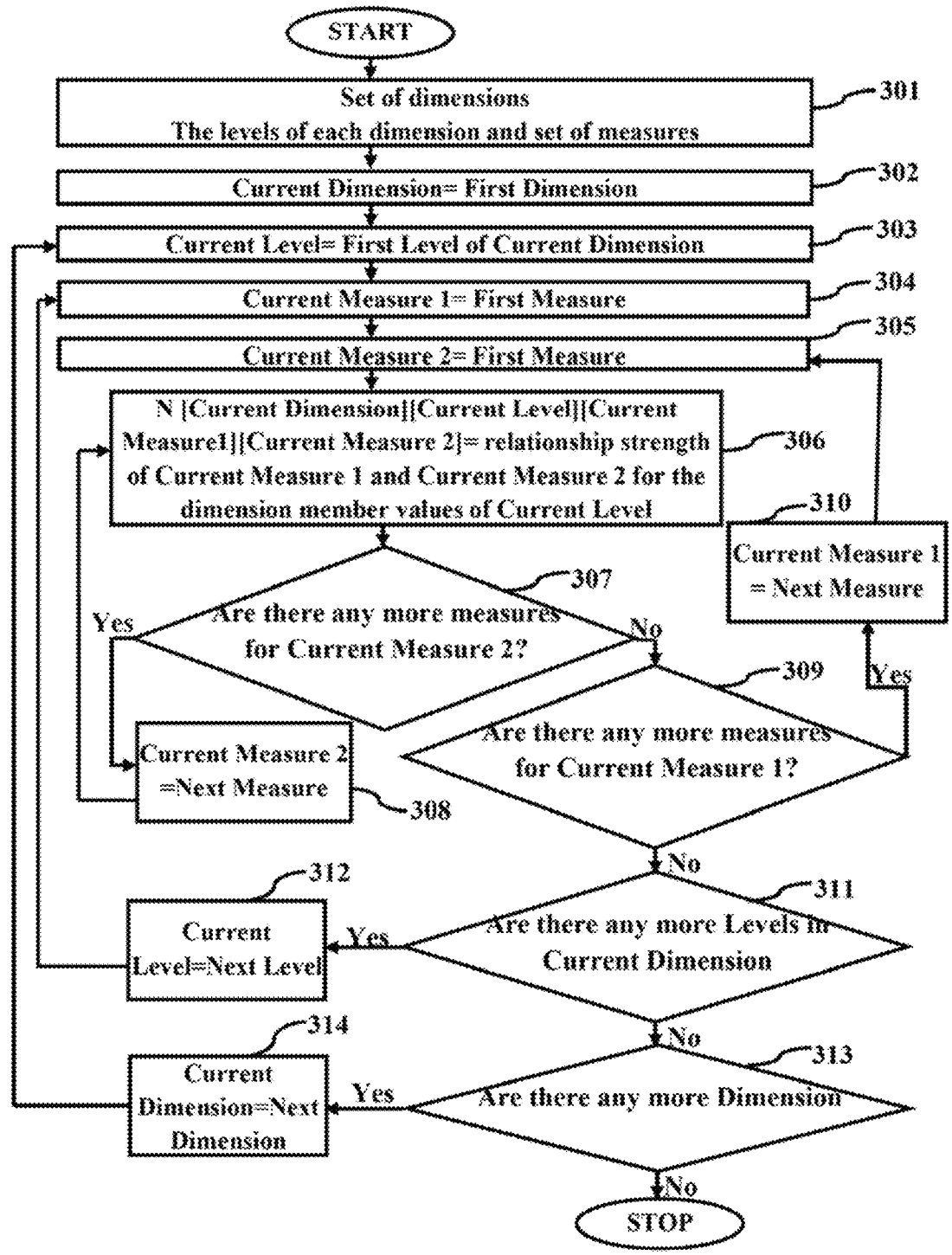
FIG. 3 illustrates a flowchart indicating a method for calculating neural metadata scores, according to an embodiment herein.

FIG. 3 is a flowchart illustrating a method for calculating neural metadata scores, according to an embodiment herein. The neural metadata framework guides the users on which measures should be seen together. If the user is looking at a measure against a dimension level, the system suggests which other measures also "make sense" with the same dimension level. The neural metadata framework creates and stores a match score i.e. Neural Metadata Score for every measure combination pair for each dimension level.

According to an embodiment herein, the method further comprises an auxiliary structure. For every measure combination pair for each dimension level, the auxiliary structure stores the number of times a user has explicitly mashed up the two measures together on his own and the number of times the user has done so after being suggested by the neural metadata framework.

According to an embodiment herein, let us assume M[] is an m-element array where each element represents a measure, D[] is an d-element array where each element represents a dimension, DL[][] is a 2 dimensional array where each element represents a dimension level, DL[i][] is the array where each element represents a level of dimension D[i] and NL[] is a d-element array that stores the number of levels in each dimension. Since the number of levels in different dimensions may be different, DL[][] may have sparsity. If D[i] has NL[i] levels, any element DL[i][j] where j>NL[i] is blank. So DL[][] array is packed from the left side.

According to an embodiment herein, the auxiliary structure is a pair of four dimensional array A1[][][][] and A2[][][][]. Their dimensionality is identical. The length of the 1st (first) dimension of A1 is d (the number of dimensions). The length of the second dimension of A1 is max (NL[i]) where i varies from 1 to d. Let's refer to this as NLmx. The length of the other two dimensions of A1 is m (the number of measures). Hence, the total number of cells in A1 is d*NLmx*m*m. The sparsity of this array depends on which measures are reportable against which dimensions, and how many levels each dimension has vis-a-vis NLmx. When a measure is not reportable against a dimension, the entire sub-array of that measure and the levels of that dimension are blank. Also, for all the cells in which the second dimension is between NL[i]+1 and NLmx, the array cell value is blank. The arrays A1 and A2 are maintained by the system, when the users create reports or respond to the mashup suggestions by the neural metadata framework by accepting the suggested mashup.

According to an embodiment herein, when the user creates a report with measures M[a] and M[b] against dimension D[c] level DL[c][e], then the method increments the value of A1[a][b][c][e] by 1. Similarly, if the user is viewing measure M[a] against dimension D[c] level DL[c][e] and among the suggested mashups, if he chooses to mashup M[b], then the method increments the value of A2[a][b][c][e] by 1.

According to an embodiment herein, the core of the neural metadata framework is the neural metadata score which is computed, stored and subsequently used for mashup suggestions. The neural metadata score is stored in a 4 dimensional array N[ ][ ][ ][ ], whose dimensionality is identical to that of A1.

FIG. 3 illustrates an algorithm for computing/calculating neural metadata scores, the algorithm comprises:

```
for each element D[i], where i varies from 1 to d loop
    for each element DL[i][j], where j varies from 1 to NL[i] loop
        for each measure M[k], where k varies from 1 to m loop
            for each measure M[p], where p varies from 1 to m loop
                N[i][j][k][p] = relationship_strength(i,j,k,p)
            end loop;
        end loop;
    end loop;
end loop;
```

With respect to FIG. 3, for the set of dimensions, levels of each dimension and set of measures are assigned or set (301). The current dimension is assigned to first dimension (302) and the current level is assigned to the first level of the current dimension (303). The current measure 1 is assigned to first measure (304) and the current measure 2 is assigned to first measure (305). Further, the strength of relationship of the current measure 1 and current measure 2 for the dimension member values of current level is calculated by the equation N[i][j][k][p]=relationship_strength(i,j,k,p) Wherein: N[i][j][k][p] is a N[Current Dimension][Current Level][Current Measure 1][Current Measure 2] (306).

Further, the method checks whether there are any more measures assigned for the current measure 2 (307). If it is yes, then the method assigns the current measure 2 as being equal to next measure (308) and redirects the process to the process mentioned in the step 306 for calculating the strength of the relationship. If there are no more measures available for the current measure 2, then the method checks if there are any more measures assigned for the current measure 1 (309). If it is yes, then the method assigns the current measure 1 as being equal to next measure (310) and redirects the process to the process mentioned in the step 305. If there are no more measures available for the current measure 1, then the method checks for any more levels present in current dimension (311). If it is yes, the method assigns the current level as being equal to the next level (312) and redirects the process to the process mentioned in the step 304. If there are no more levels in current dimension, then the method checks for any more dimensions (313). If it is yes, then the method assigns that current dimension=next dimension (314), and redirects the process to the process mentioned in the step 303. The method or the process is terminated, if there are no more dimensions.

Figure 4:
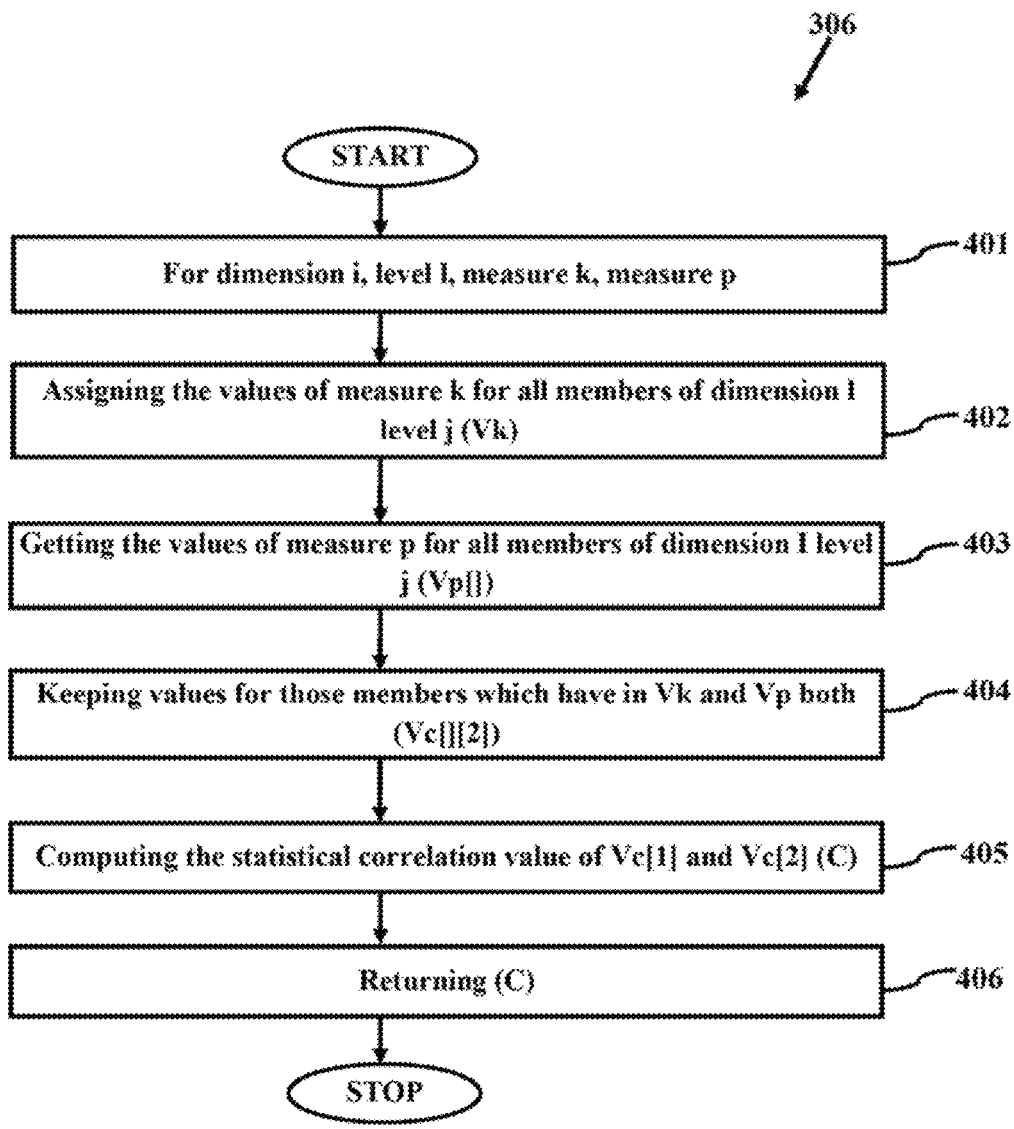
FIG. 4 illustrates a flowchart indicating a method for computing a measure of strength of interconnections between the data elements, according to an embodiment herein.

FIG. 4 illustrates a flowchart indicating a method for computing a strength of interconnections between the data elements, according to an embodiment herein. The method for computing the strength of interconnections between the data elements (step 306 of FIG. 3) comprises the steps of assigning level l, measure k, measure p for dimension i, (401). The values of measure k are assigned for all members of dimension l level j, i.e. V (402). The values of measure p are obtained for all members of dimension l level j, i.e. Vp[ ] (403). The values are kept for those members which have in Vk and Vp both, i.e. Vc[ ][2] (404). The statistical correlation value is computed for Vc[1] and Vc[2], i.e. C (405) and the value of C, which is the strength of interconnections between the data elements Vc[1] and Vc[2] is returned (406). FIG. 4 illustrates an algorithm for computing strength of interconnections between the data elements, the algorithm comprises:

```
relationship_strength(dimension i, level j, measure k, measure p)
{MV[ ] = members of dimension i level j;
    x = number of member elements in MV[ ];
    Vk[ ] = value of measure k for each member of dimension i level j
        in the same order of members as they appear in MV[ ];
    Vp[ ] = value of measure p for each member of dimension i level j
        in the same order of members as they appear in MV[ ];
    y = 0;
    DATA1[ ], DATA2[ ] arrays of maximum size x, initialized to blank.
    for z in 1 to x loop
    if(Vk[z] is filled AND Vp[z] is filled) { y = y + 1;
        DATA1[y] = Vk[z];
        DATA2[y] = Vp[z];} end loop;
    return statistical_correlation(DATA1, DATA2);}
```

Figure 5:
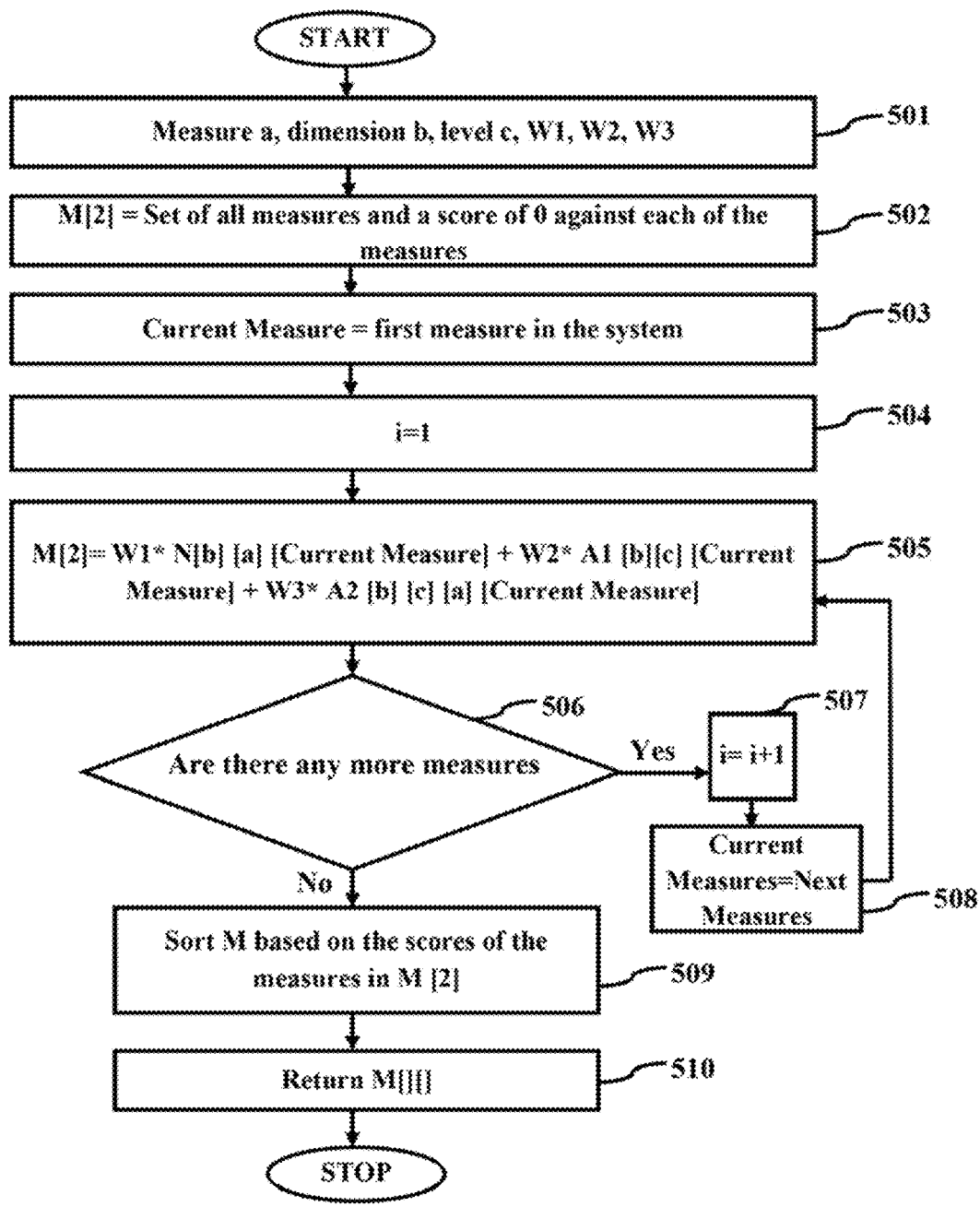
FIG. 5 illustrates a flowchart indicating a method for providing mashup suggestions by the neural metadata framework, according to an embodiment herein.

FIG. 5 illustrates a flowchart indicating a method for providing mashup suggestions by the neural metadata framework, according to an embodiment herein. The method comprises the following steps: when the user queries measure a, dimension b, level c, W1, W2, W3 (501), all measures and a score of 0 is set against each of the measures, i.e. M[2] (502). The current measure is assigned to be equal to the first measure in the system (503). The value of i is assigned to be equal to one (504). The value of (W1+N[b][a][Current Measure])+(W2*A1[b][c][Current Measure])+(W3*A2[b][c][a][Current Measure]) is computed and assumed to be M[2] (505). Any more measure is measured (506). If it is yes, the value of i+1 is computed and assumed to be equal to i (507). The value of current measure is assigned to be equal to the value of next measure (508). The elements representing the measures are sorted or classified based on the scores of the measures in M[2] (509), and array of measure M[ ][ ] is returned/displayed (510).

According to an embodiment herein, FIG. 5 illustrates an algorithm for providing mashup suggestions by the neural metadata framework, the algorithm comprises:

```
Query(measure a, dimension b, level c)
    returns an array of measures sorted in a descending order of net score
{MM[ ] array of measure, MS[ ] array of net scores, both of these have a
maximum size of m.
    y = 0;
    for each M[i] where i varies from 1 to m loop
    if(i != a) {y = y + 1;
        MM[y] = M[i];
        MS[y] = w1*N[b, c, a, i] + w2*A1[b, c, a, i] + w3*A2[b,
            c, a, i];}end loop:
    Sort the elements of MM[ ] based on the corresponding scores stored
in MS[ ]; return MM[ ];}
```

According to an embodiment herein, the algorithm adopted for providing the mashup suggestions by the neural metadata framework considers the statistical correlation between two measures in the user's context of dimension being used. The algorithm is an adaptive one, since the net Neural Metadata Score gets adjusted in the future based on user's decision to accept the mashup suggestions.

According to an embodiment herein, a method for maintaining the neural metadata scores to minimize the cost of maintenance of scores is provided. The method adopts an event driven incremental strategy for minimizing the cost of the maintenance of the scores.

According to an embodiment herein, when the fresh data are loaded into a nanomart, the subarrays of N[ ][ ][ ][ ] that pertain to the measures of the affected nanomart are recomputed. Further, when a new measure is created or deleted, additional subarrays are inserted to the subarrays of the dimensions against this new measure is reportable. Further, when a new dimension is created or deleted, additional subarrays are inserted into the array against the new dimension and its levels. Further, when a new dimension level is created in an existing dimension, and the dimension is the one that had the NLMx levels, a subarray is inserted against every dimensions and NLMx is incremented by 1. If the dimension affected had less than NLmx levels, an empty subarray already exist to accommodate the values. This is used to fill the scores and the matrix is a bit less sparse.

According to an embodiment herein, when an existing measure becomes reportable against a dimension that it is not reportable against earlier, no new space needs to be allocated. The subarrays representing the combination of measures are filled with the scores. Further, the deletions are handled by filling the affected subarrays with blanks. If a measure is no longer reported by a dimension, the affected subarray of the dimension is filled with blanks. The non trivial case is the one in which a dimension level is deleted and the dimension has NLmx levels before the deletion. If there is no other dimension that has NLmx levels, it leads to a decrease in NLmx by 1. The unnecessary subarrays are deleted now.

According to an embodiment herein, a method for optimizing disk space and memory is provided. The method of optimizing disk space and memory comprises, handling the sparsity of the matrices A1, A2 and N, by storing the number of levels in each dimension separately. The arrays are traversed by looking this up first. In this way, the boundaries of each dimension in A1/A2/N are determined. Since the relationship strength is commutative, the value of <M1, M2> is the same as <M2, M1>. Hence half of the matrix including the diagonal is skipped.

According to an embodiment herein, a method for run time optimization is provided. The method comprises eliminating the array copies in the algorithm outlined by having a structure that stores the scores in the node and using a linked list instead of an array.

According to an embodiment herein, a method for optimizing multiple dimensions in a report is provided. The case where there are more than one dimensions involved in a report, the mashup suggestions query is done one dimension at a time. From the results, those measures are taken which are reportable against all the dimensions involved. Finally, the measures are presented as a mashup suggestion in a descending order of their net score.

FIG. 6A and FIG. 6B jointly illustrate a TABLE indicating a visual representation of a logical enterprise data warehouse created by assembling a plurality of nanomart storage structures, according to an embodiment herein. With respect to FIG. 6, consider the case where the measures are: Number of Items Sold, Revenue, Expenses, and Temperature;

The dimensions are: Time, Product, and Geography;

The dimension levels are: Time (Month, Quarter, Year), Product (Product Name, Product Category), and Geography (Country, State);

The members as time: and wherein time comprises:
Month→Quarter→Year
Jan→Q1→2013
Feb→Q1→2013
Mar→Q1→2013
Apr→Q2→2013
May→Q2→2013
Jun→Q2→2013
Jul→Q3→2013
Aug→Q3→2013
Sep→Q3→2013
Oct→Q4→2013
Nov→Q4→2013
Dec→Q4→2013

The members as Product: and wherein the product comprises:
Product Name→Product Category
Ice Cream→Food
Chocolates→Food
Jeans→Clothes
Pullover→Clothes The members as Geography: and wherein the geography comprises:
Karnataka→India
Kerala→India For the sake of clarity, the un-optimized version of the algorithm is provided, where NLmx is 3 in this case. Now, A1, A2 and N are four dimensional arrays, and the index of array cells are as shown in table 600 in FIG. 6A-6B.

Figure 7:
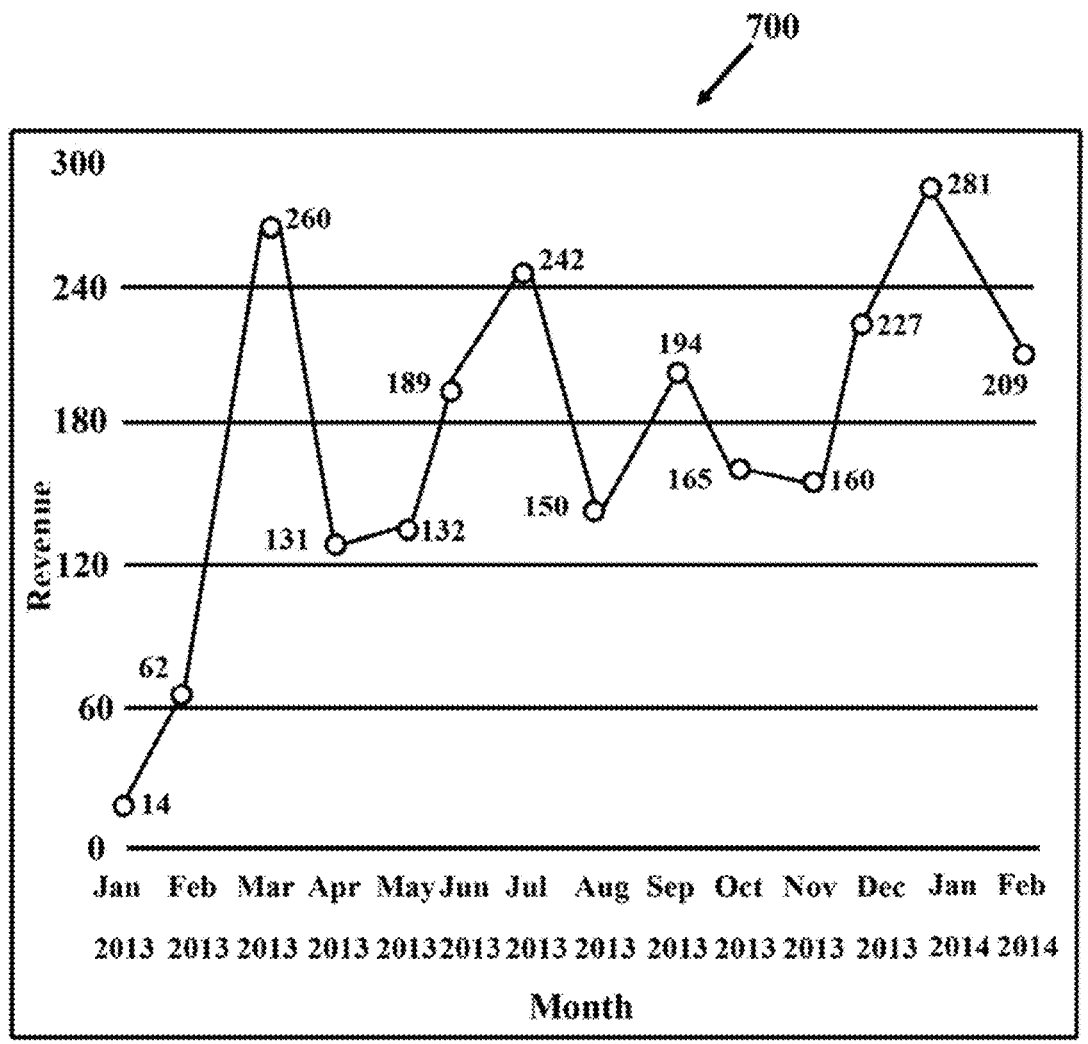
FIG. 7 illustrates a chart indicating a visual representation of mashing up a plurality of interconnected data elements from the plurality of nanomart storage structures to produce a business analytics, according to an embodiment herein.

FIG. 7 illustrates a chart indicating a visual representation of mashing up a plurality of interconnected data elements from the plurality of nanomart storage structures to produce a business analytics, according to an embodiment herein. With respect to FIG. 7 as shown in graph 700, considering the case where the user is looking at Revenue by Month and assuming that the weights W1, W2 and W3 are 10, 3 and 5 respectively. Then mashup suggestion is provided on the basis of the query outlined earlier. For the measure Revenue in the context of Month, the net scores are as follows:

Net Score [Number of Items Sold]=10*2+3*0+5*0.37=21.85

Net Score [Revenue]=25

Net Score [Expenses]=10*0+3*0+5*0.34=1.7

Net Score [Temperature]=10*0+3*0+5*0.61=3.05

Since the measure itself is not suggested, the 2nd item above is ignored. The sorted mashup suggestions are: (a) Number of Items Sold (Net Score 21.85) (b) Temperature (Net Score 3.05) and (c) Expenses (Net Score 1.7).

Figure 8:
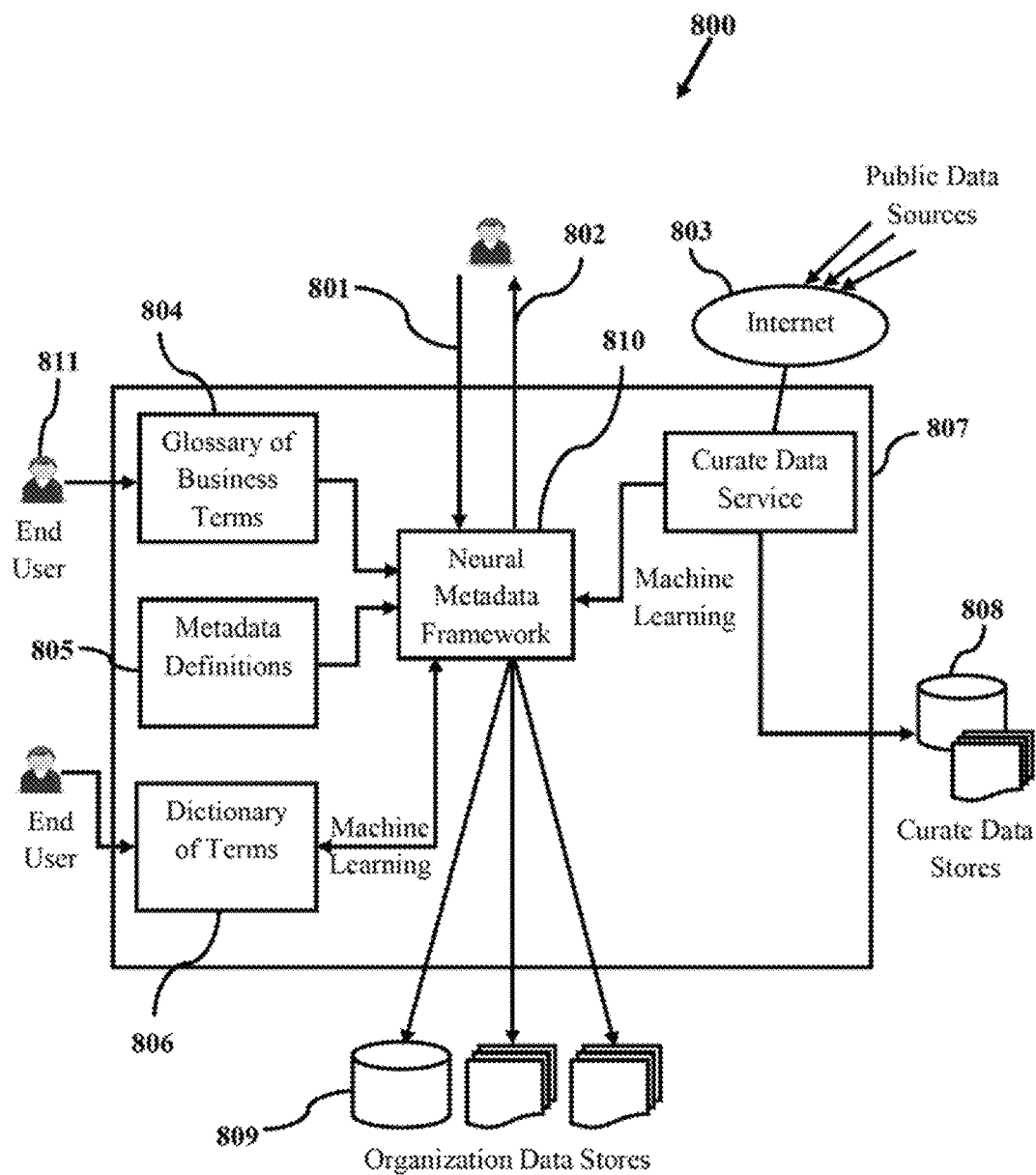
FIG. 8 illustrates an architectural block diagram of a system for storing and provisioning system catalogue(s) of metadata object relationships, from diverse and disparate physical data elements, according to an embodiment herein.

FIG. 8 illustrates an architectural block diagram of a system for storing and provisioning system catalogue(s) of metadata object relationships, from diverse and disparate physical data elements, according to an embodiment herein. The architecture for storing and provisioning neural metadata comprises a Neural Metadata Framework 810, a Curate Data Service 807, a Glossary of Business Terms 804, Metadata Definitions 805 and a Dictionary of Terms 806. Internet 803 provides data from various public data stores. The Curated Data Service 807 indexes and stores the data elements in the Curated Data Stores 808. The Neural Metadata Framework 810 performs a Machine Learning by adopting an automated search and data discovery to identify inter-relationships between public data elements and organizational data elements from the Curated Data Stores 808 and Organization Data Stores 809 respectively. The Neural Metadata Framework 810 performs cleansing and transforming inter-related data elements to form the system catalogue(s) of metadata object relationships, referred to as neural metadata. The Glossary of Business Terms 804 comprises terms and keywords relating to organization's business strategies and analytics. The Metadata Definitions 805 comprises metadata keywords and definitions with respect to particular inter-related data elements. The Dictionary of Terms 806 comprises the search terms related to the relevant neural metadata for the purpose of business analytics. The end users 811 inputs the search items or keywords to retrieve the relevant business analytical results in the form including but not limited to graphical representations. In the process of retrieving inter-related data elements for business analysis, the end users 811 are allowed to add new business terms in the Glossary of Business Terms 804 and Dictionary of Terms 806 for improving the Machine Learning procedure time to time. The end-user sends a request 801 to the Neural Metadata Framework 810 for a specific dataset/data point (neural metadata). The Neural Metadata Framework 810 then responds back to the user with the organization related data extracted from the Organization Data Stores 809 and related data extracted from the Curate Data Stores 808 with respect to the end-users request 801. The architecture of the Neural Metadata Framework 810 is basically built with artificial intelligence modules, which work robotically to define relationships between data elements and to store and provision definitions of neural metadata.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented method comprising instructions stored on a non-transitory computer readable storage medium and executed on a hardware processor in a computer system provided with a memory for storing and provisioning system catalogue(s) of metadata object relationships, from diverse and disparate physical data elements, the computer implemented method comprises the steps of:

creating a logical enterprise data warehouse by assembling a plurality of nanomart storage structures;

visually mashing up a plurality of interconnected data elements from the plurality of nanomart storage structures to produce business analytics by using an algorithm;

generating a neural metadata framework for providing a mathematical model to abstract and catalogue the plurality of data elements from the plurality of nanomart storage structures using an algorithm;

applying a plurality of algorithms for identifying an interconnected relationship of data elements stored in the plurality of nanomart storage structures with respect to an organization or entity;

adopting a machine learning process to acquire a common relationship from a plurality of the identified interconnected relationship of the data elements;

performing data mining to identify a statistical correlation between the data elements; and computing a measure of strength of interconnections between the data elements by a preset algorithm;

wherein the data elements are abstracted and catalogued using the mathematical model based on a business glossary, and wherein the business glossary comprises a plurality of representation values and codes stored in the plurality of nanomart storage structures, and wherein the plurality of nanomart storage structures is a physical storage device of related and unrelated data derived from a plurality of files, technical metadata, and direct upload of data through connections from web based on the mathematical model using the business glossary, and wherein the nanomart storage structure comprises a set of measures and a set of dimensions, and wherein the set of dimensions comprises dimension levels and dimension members, and wherein the set of measures define a measurable parameter for the organization or the entity, and wherein the dimensions define a sub measurable parameter for measure, and wherein the dimension level defines a sub level in a dimension, and wherein the dimension levels comprise a set of dimension members, and wherein the measurable parameter includes sales, revenue, expenses and a number of customers in the organization, and wherein the dimensions include a product to be sold, time, geographical area or territory or region, sales representatives, and wherein the plurality of algorithms is applied to identify a type of interconnected relationship between the interconnected data elements, by estimating an inter-relationship of the interconnected data elements, by estimating an inter-relationship of a construct, and wherein the interrelationship of the construct is identified based on stored explicit human inputs, and implicit derivatives and calculations of cross-correlations among the data elements in the plurality of nanomart storage structures, and wherein the visually mashing up of the interconnected data elements is prepared and presented after recognizing the inter-relationships of the data elements from the plurality of nanomart storage structures, to produce the business analytics, and wherein the visually mashing up of the interconnected data elements from the plurality of nanomart storage structures is performed to create results of the business analytics in a plurality of forms, and wherein the plurality of forms include a plurality of charts.

2. The computer implemented method according to claim 1, wherein the neural metadata framework stores and provisions a neural metadata from a plurality of sources of discrete data elements, and wherein the discrete data dements are a plurality of unrecognized data curated from a plurality of data stores that are arranged internal or external to a referenced organization or entity.

3. The computer implemented method according to claim 2, wherein the neural metadata is configured to select a desired and suitable discrete data elements stored within the nanomart storage structure.

4. The computer implemented method according to claim 2, wherein the neural metadata framework is an architecture built with a plurality of artificial intelligence modules to define relationships between the data elements for storing and provisioning the neural metadata.

5. The computer implemented method according to claim 2, wherein the neural metadata is stored and provisioned based on the estimated strength of the interconnections between the data elements.

6. The computer implemented method according to claim 1, wherein the data elements are abstracted and catalogued from a plurality of data sources distributed within a referenced organization or entity, and wherein the abstracted and catalogued data elements form a neural metadata based on an inter-relationship or interconnection between the data elements.

7. The computer implemented method according to claim 1, wherein the explicit human input comprises ordering of data elements together or using the data elements in the same context.

8. The computer implemented method according to claim 1, wherein the results of the business analytics and a user picked analytical results of the interconnected data elements are stored, and wherein the a plurality of machine learning algorithms of the neural metadata framework are is applied to enrich a future process of business analytics based on the results of analysis stored over a period of time.

* * * * *

UNITED STATES PATENT AND TRADEMARK OFFICE
CERTIFICATE OF CORRECTION

PATENT NO. : 10,521,455 B2
APPLICATION NO. : 14/218014
DATED : December 31, 2019
INVENTOR(S) : Ramakrishnan et al.

It is certified that error appears in the above-identified patent and that said Letters Patent is hereby corrected as shown below:

On the Title Page

Please replace the Inventors with the following updated list:
Mahesh Ramakrishnan, Bangalore (IN)
Sumant Sarkar, Bangalore (IN)
Abhishek Dhirendra Purohit, Bangalore (IN)
Vinod Copram Viswanath, Bangalore (IN)

Signed and Sealed this
Twelfth Day of April, 2022

Drew Hirshfeld
*Performing the Functions and Duties of the
Under Secretary of Commerce for Intellectual Property and
Director of the United States Patent and Trademark Office*